April 3, 1956
G. C. ENGSTRAND
2,740,367
FLOATING DRY DOCK
Filed Dec. 7, 1950
2 Sheets-Sheet 2
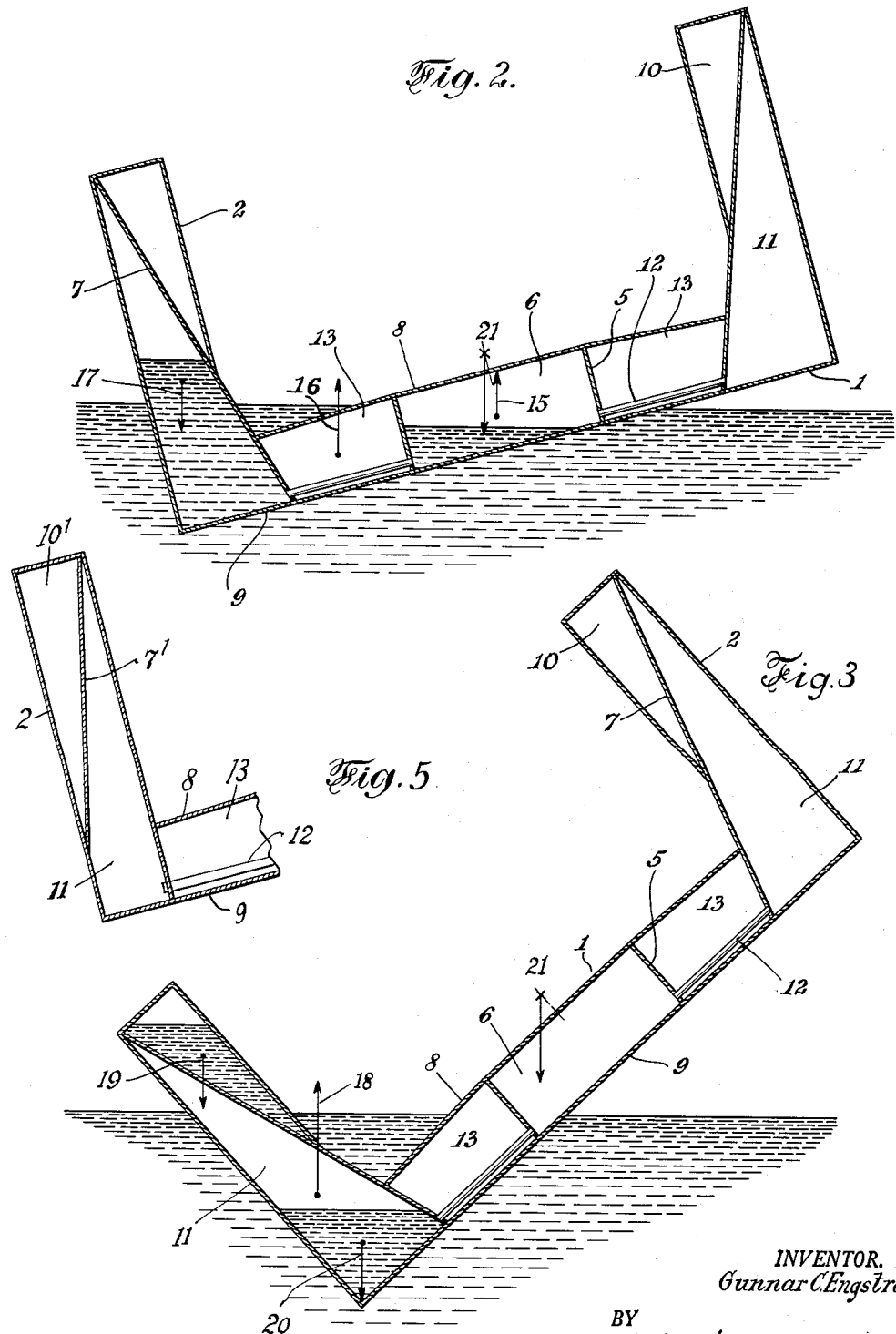
INVENTOR.
Gunnar C. Engstrand,
BY William F. Nickel
ATTORNEY.

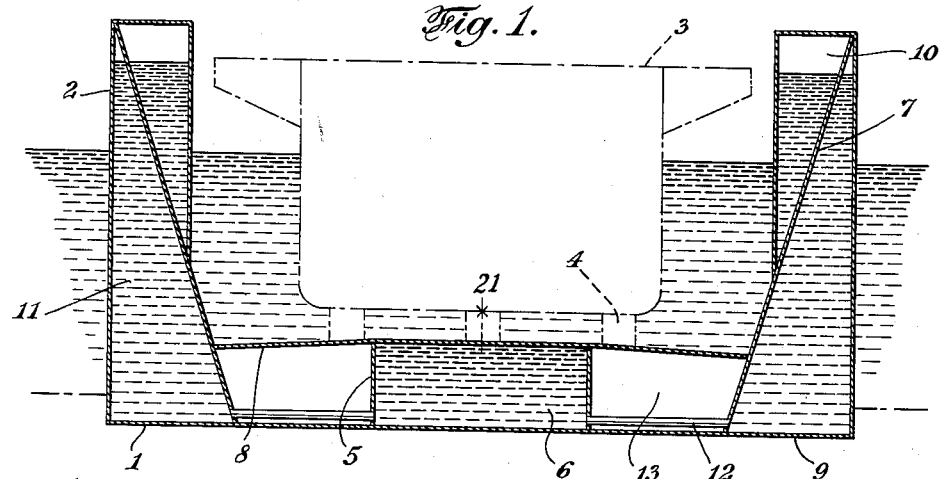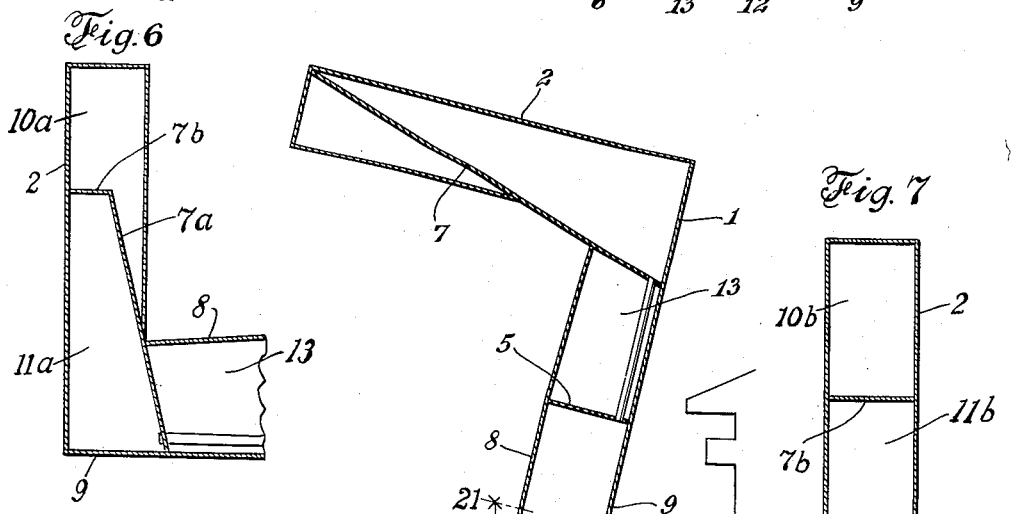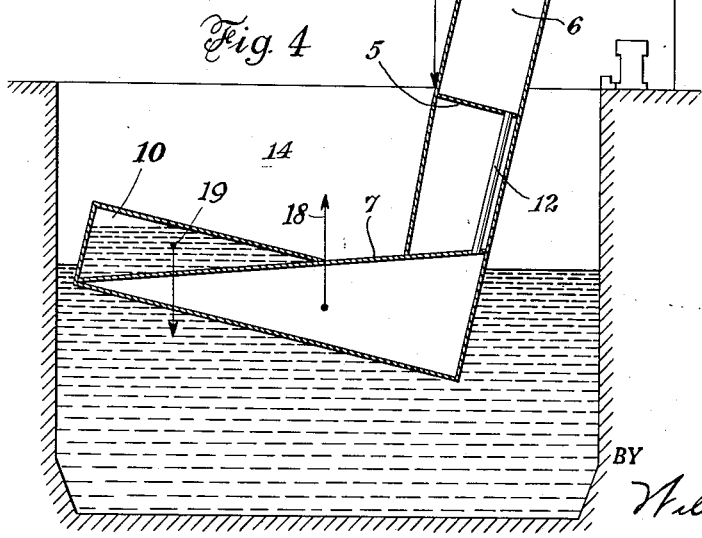

United States Patent Office 2,740,367
Patented Apr. 3, 1956

2,740,367

FLOATING DRY DOCK

Gunnar C. Engstrand, Staten Island, N. Y., assignor, by mesne assignments, to Frederic R. Harris, Inc., New York, N. Y., a corporation of New York Application December 7, 1950, Serial No. 199,650

7 Claims. (Cl. 114—45)

My invention is an improvement in floating dry docks, comprising a pontoon, hull and side walls, and has for its chief object to provide a dock that may be easily managed and navigated to be floated through a water passage considerably narrower than the width of beam of the dock.

To this end, the invention comprises a floating dry dock of relatively simple design that may be tilted around its longitudinal axis for nearly 90° to a position that is nearly vertical to its regular working position on an even keel. When rotated up to such an angle, the dock will present a substantially reduced beam to a relatively narrow passageway such as the interior space of a canal lock; because the width of the dock is greater than the height of its side walls. The turning or tilting is accomplished solely by pumping, and the interior of the dock has different compartments that are built and arranged to be suitable for my purpose. The tilting may be expeditiously performed at any time with no special preparation whatever.

To this end, the dry dock is provided with a watertight bulkhead in each side wall, these bulkheads dividing the interior of the wing or side wall into separate compartments.

In this manner, I construct in each wing wall of the dock an upper compartment that will be flooded and a lower compartment that will be pumped out and lie at or beneath the plane of the outside water level when the dock is in its extreme tilted position. With the other wing wall and the hull between the sides also pumped out, the dock is then ready for canal passage.

Other important characteristics are also incorporated in my improved dock to facilitate quick and efficient handling thereof, and these features and their functions are fully described at length herein. My invention is especially adapted for the passage of military and naval docks through the Panama Canal, where the locks are only 110 feet wide while floating dry docks range up to 150 feet in width, as is required for the servicing of airplane carriers and other large vessels.

In the drawings:

Figure 1 shows a dock according to my invention submerged, with the outline of a ship upon blocks in broken lines, included.

Figure 2 illustrates the first stage of the tilting operation which is, of course, executed with no ship in the dock.

Figure 3 shows the second phase, and

Figure 4 shows the dock in its final tilted-over position; and

Figures 5, 6 and 7 are sectional details of modified forms of my invention.

The numeral 1 indicates the hull or pontoon of the dock, which has the wings or walls 2 on its top along the sides. When a ship is to be raised, the dock is first sunk and the ship 3 is floated in to rest on the keel blocks 4. The hull is divided inside by two longitudinal upright bulkheads 5, extending from end to end. Between the bulkheads 5 is the central flooding compartment 6. In each wing wall 2 is a sloping bulkhead 7, also extending from end to end the full length of the dock, and from the upper outer corner of the wall down past the inner corner at the level of the deck 8 of the pontoon, to the bottom 9.

The sloping bulkheads 7 are the means whereby the upper interior space of the wing walls 2 are divided from the remainder of the interior of the wing walls to make upper and lower compartments 10 and 11. Pipes 12 connect both compartments 11 to the compartments 6, running through buoyancy chambers 13 between the compartments 6 and 11 and the compartments 10 and 11 may be connected by pipes not shown, so that the water may be pumped out from the entire dock from one side thereof. For security reasons, both the wing walls are equipped with the sloping bulkheads 7 so that if one side is damaged from any cause that side of the dock may be lifted out of the water with no loss of time. The pumping machinery, not shown, can be located in the buoyancy chambers 13, which are never flooded.

It is essential that the buoyancy chambers 13 be of such size that the weight of an equal volume of water is considerably in excess of the weight of the dock. To submerge it, the dock has to admit water to the compartments 6, 10 and 11; and to keep the dock on an even keel when servicing a ship, water must be pumped into both the walls 2 of the dock to the same level, all as shown in Figure 1.

To incline the dock, the one wing wall 2 must be empty and part of the adjacent central compartment or chamber 6 and the lower or waterborne wing or wall 2 be partially pumped out, as illustrated in Figure 2. The buoyancy chambers 13 are located just inside the wing walls 2 in the pontoon 1 and the water-tight bulkheads 5 and 7 form the sides thereof. Inside the buoyancy chambers the pumping machinery is located. These buoyancy chambers 13 are spaced apart so that there is a center pumping or flooding compartment 6 in the pontoon. Also the pipes 12 running through the buoyancy chambers permit water transfer from one side of the dock to the other. The necessary valves, pumps etc. are not shown on the drawings but will be of well known manufacture.

The next step is to evacuate the chambers 6 entirely of water and to pump out some of the water in the lower compartment 11 of the lowered wall 2, as in Figure 3. To get the dock fully into position shown in Figure 4, the compartment 11 of the lower wing wall must be pumped out further and the upper chamber 10 of this wall must be nearly filled with water and the rest of the dock must be empty. When turned over to this degree, the dock is ready for transit through the relatively narrow passage 14.

It is understood that modifications may be made in the structural details of my floating dock without departing from the scope and spirit of my invention. The dock framework and outside plating of my dock are all of conventional design, and my invention resides in arrangement of the various bulkheads dividing the interior into compartments by which the results described above are obtained.

The dock, of course, has the necessary piping with inlet and outlet ports to fill and pump out the central compartment 6 and the upper compartments 10 and the lower compartments 11.

In the first stage of tilting, the dock is caused to list by the water that only partly fills the compartment 6 and the lower part of the compartment 11 at one side. The buoyant effects of the unfilled compartment 6 and the lowered compartment 13 are indicated by the arrows 15 and 16 respectively, and this is balanced by the effect of the water in the adjacent compartment 11, as indicated by the arrow 17 in Figure 2.

In the next stage, the compartment 6 is empty and some buoyancy is given to the lower part of the dock by the unfilled portion of the compartment 11 in the lowered wing. This buoyancy is offset by the presence of the water in the two compartments of the same wing, as indicated by the arrows 19 and 20. (See Figure 3.)

When the dock attains the full tilted position illustrated in Figure 4, the weight of the water with the leverage represented by the distance between a vertical line through the arrow 19 and the center of gravity of the dock indicated at 21 is sufficient to balance the effective weight of the dock at whatever leverage exists on the opposite side of the point 21. Hence the dock is in stable equilibrium in the narrow passageway 14.

Figure 5 shows the partition 7' inclined from the inner upper corner of the wing wall in an outward and downward direction toward the outboard face of the wing wall, thus dividing the upper compartment 10' from the other compartment 11.

In Figure 6 the bulkhead 7a has a lower portion extending from within the wing wall down to the bottom of the deck and an upper horizontal portion 7b which extends to the outboard side of the wing wall; and in Figure 7 each wing wall has a horizontal bulkhead 7b dividing the wing wall into upper and lower compartments 10b and 11b.

The over-all height of the wing walls of the dock is about 54 percent of the over-all width. The width or thickness of each wall is about 21 percent of the total height of the dock, and the thickness of each wall and the depth of the pontoon are about equal.

The volumes of the chambers 10 and 13 are about equal and may be taken as one, the volume of the chamber 13 being slightly greater. The volume of the central chamber 6 can be taken as one and one-half and the volume of each chamber 11 as two.

Having described my invention, what I claim as new is:

1. The method of tilting a vessel about its longitudinal axis, which consists in imparting a list to the vessel by admitting water in the hull and water along the lower part of one side, withdrawing the water wholly from the hull and part of the water along the lower part of said side and simultaneously admitting water to the upper portion of said side, evacuating the remaining water from the lower part of the side and admitting more water to the upper portion of said side, and causing the vessel to tilt by force of gravity during all these operations till the outboard face of said side is under water.

2. The method of tilting a dock having a pontoon and wings at the sides with the height of each wing less than the beam of the dock, which consists in imparting a list to the dock by admitting water in the middle of the hull along the length thereof and water in one of said wings at the lower portion thereof, evacuating the water from the hull and part of the water from said wing, concurrently admitting water to the upper portion of the wing and confining the water in said upper portion to a space extending down from the top of said wing, completing the evacuation of water from the lower portion while still admitting water to the upper portion and during all said operations causing the dock to list continuously by the force of gravity till the outboard side of said wing is water-borne and the remainder above the water.

3. A floating dry dock having a pontoon hull with a deck and wings at the sides of the hull, the height of each wing being less than the beam of the dock, said hull having a central compartment and each wing having a pair of compartments closed against each other, all said compartments to be flooded and pumped out as required to sink and raise the dock, the compartments in each wing occupying the whole interior of said wing, a bulkhead between said compartments in each wing, one of said last-named compartments extending from the top of the wing containing said compartment towards the deck of the pontoon hull, said one compartment having such capacity when flooded as to hold said wing water-borne along its entire outboard side and the remainder of the dock above water in nearly vertical position.

4. A floating dry dock having a pontoon hull with a deck and wings at the sides of the hull, the height of each wing being less than the beam of the dock, said hull having a compartment and each wing having a pair of compartments all to be flooded and pumped out as required to sink and raise the dock, the compartments in each wing occupying the whole interior of said wing, a bulkhead between said compartments in each wing, one of said last-named compartments extending from the top of the wing containing said compartment towards the deck of the pontoon, said one compartment having such capacity when flooded as to hold said wing water-borne along its entire outboard side and the remainder of the dock above water in nearly vertical position, said bulkhead extending from the upper part of said wing downward at an incline toward the outboard face of said wing adjacent the deck of said pontoon hull.

5. A floating dry dock having a pontoon hull with a deck and wings at the sides of the hull, the height of each wing being less than the beam of the dock, said hull having a compartment and each wing having a pair of compartments all to be flooded and pumped out as required to sink and raise the dock, the compartments in each wing occupying the whole interior of said wing, a bulkhead between said compartments in each wing, one of said last-named compartments extending from the top of the wing containing said compartment towards the deck of the pontoon, said one compartment having such capacity when flooded as to hold said wing water-borne along its entire outboard side and the remainder of the dock above water in nearly vertical position, said compartment in the hull extending along the middle thereof, said hull having buoyancy compartments, one extending along the hull between said middle compartment and each side of the said pontoon hull.

6. A floating dry dock having a pontoon hull with a deck and wings at the sides of the hull, the height of each wing being less than the beam of the dock, said hull having a compartment and each wing having a pair of compartments all to be flooded and pumped out as required to sink and raise the dock, the compartments in each wing occupying the whole interior of said wing, a bulkhead between said compartments in each wing, one of said last-named compartments extending from the top of the wing containing said compartment towards the deck of the pontoon, said one compartment having such capacity when flooded as to hold said wing water-borne along its entire outboard side and the remainder of the dock above water in nearly vertical position, said compartment in the hull extending along the middle thereof, said hull having buoyancy compartments, one extending along the hull between said middle compartment and each side of the hull, said bulkhead extending from the upper part of said wing downward at an incline towards the deck of said pontoon hull.

7. A floating dry dock having a pontoon hull with a deck and wings at the sides of the hull, the height of each wing being less than the beam of the dock, said hull having a central compartment and each wing having a pair of compartments closed against each other, all said compartments to be flooded and pumped out as required to sink and raise the dock, the compartments in each wing occupying the whole interior of said wing, a bulkhead between said compartments in each wing, one of said last-named compartments extending from the top of the wing containing said compartment towards the deck of the pontoon, said one compartment having such capacity when flooded as to hold said wing water-borne along its entire outboard side and the remainder of the dock above water in nearly vertical position, said bulkhead extending from the upper inner corner of said wing downward at an incline towards the deck of said pontoon hull and ending adjacent the level of the pontoon deck.

References Cited in the file of this patent

UNITED STATES PATENTS

| | | | |
|---|---|---|---|
| 256,608 | Watts | Apr. 18, | 1882 |
| 536,683 | Cousins | Apr. 2, | 1895 |
| 755,854 | Diecknoff | Mar. 29, | 1904 |
| 984,133 | Giese | Feb. 14, | 1911 |
| 1,486,257 | Muller | Mar. 11, | 1924 |

FOREIGN PATENTS

| | | | |
|---|---|---|---|
| 393,111 | Germany | July 12, | 1923 |